United States Patent
Jung et al.

(10) Patent No.: US 7,646,917 B2
(45) Date of Patent: Jan. 12, 2010

(54) METHOD AND APPARATUS FOR DETECTING CORNER

(75) Inventors: Myungjin Jung, Suwon-si (KR); Hyoungkl Lee, Suwon-si (KR); Dongryeol Park, Hwaseong-si (KR); Seokwon Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 627 days.

(21) Appl. No.: 11/282,605

(22) Filed: Nov. 21, 2005

(65) Prior Publication Data

US 2006/0115160 A1    Jun. 1, 2006

(30) Foreign Application Priority Data

Nov. 26, 2004    (KR) .................. 10-2004-0098148

(51) Int. Cl.
*G06K 9/48* (2006.01)
*G06K 9/46* (2006.01)
*G06K 9/62* (2006.01)

(52) U.S. Cl. .................. 382/199; 382/190; 382/224

(58) Field of Classification Search .................. 382/103, 382/104, 190, 199
See application file for complete search history.

(56) References Cited

U.S. PATENT DOCUMENTS

| 5,267,325 | A  | * | 11/1993 | Barron et al. | 382/174 |
| 6,961,466 | B2 | * | 11/2005 | Imagawa et al. | 382/190 |
| 7,365,771 | B2 | * | 4/2008  | Kahn et al. | 348/207.99 |
| 2002/0051578 | A1 | * | 5/2002 | Imagawa et al. | 382/224 |
| 2003/0202098 | A1 | * | 10/2003 | Hsieh | 348/151 |

OTHER PUBLICATIONS

Alexander Toet, Hierarchical Image Fusion, 1990, Machine Vision and Applications, 3: 1-11.*

* cited by examiner

*Primary Examiner*—Matthew C Bella
*Assistant Examiner*—Thomas A Conway
(74) *Attorney, Agent, or Firm*—Staas & Halsey LLP

(57) ABSTRACT

A method of detecting a corner, and an apparatus to perform the method, the method including acquiring a visible light image and an infrared image of a spatial area of interest; and extracting corner information of the spatial area of interest using the acquired visible light image and the acquired infrared image.

23 Claims, 8 Drawing Sheets

VISIBLE LIGHT IMAGE WHEN FILTER IS REMOVED

CONVENTIONAL STRUCTURED LIGHT IMAGE

VERTICAL EDGE MAP DETECTED FROM VISIBLE LIGHT IMAGE

HORIZONTAL EDGE MAP DETECTED FROM STRUCTURED LIGHT IMAGE

OVERLAP EDGE MAP OBTAINED BY OVERLAPPING HORIZONTAL EDGE MAP AND VERTICAL EDGE MAP

INTERSECTION POINTS BETWEEN HORIZONTAL EDGES AND VERTICAL EDGES

METHOD AND APPARATUS FOR DETECTING CORNER

CROSS-REFERENCE TO RELATED APPLICATIONS

This application claims the benefit of Korean Patent Application No. 10-2004-0098148, filed on Nov. 26, 2004, in the Korean Intellectual Property Office, the disclosure of which is incorporated herein by reference.

BACKGROUND OF THE INVENTION

1. Field of the Invention

The present invention relates to detection of a corner in a space, and, more particularly, to a method of stably detecting a corner in a remote area, and an apparatus to perform the method.

2. Description of the Related Art

In recent years, much attention has been drawn to mobile robots that operate in indoor environments due to the need for health, security, home networks, and entertainment. Human-robot interaction (HRI) is essential to these mobile robots. Robots include devices such as microphones, vision systems, ultrasonic sensors, infrared sensors, and laser sensors, and recognize humans and their surroundings using those devices. In particular, the mobile robots can more effectively move by detecting obstacles, such as walls and/or corners, and avoiding crashing into the obstacles based on detected obstacle information during movement in a space.

Corner points that exist in a space are used to compensate for the location of a moving robot in a mobile robot location estimation technique, simultaneous localization and mapping (SLAM), or to calculate the location of a user in a user tracking system.

Conventionally, there has been disclosed a distance sensing device using a structured light distance sensing system. The structured light distance sensing system can easily measure a short distance, but its measurement resolution decreases as a distance increases, resulting in performance degradation. Therefore, it is not easy to detect a corner in a remote area using only the structured light distance sensing system.

Also, there has been disclosed a conventional technique for sensing a distance using both a laser sensor and a general camera. Although a corner can be more stably detected using information obtained from the laser sensor and the general camera, an expensive laser sensor is required, and the technique thus involves a high cost.

SUMMARY OF THE INVENTION

The present invention provides a method, and an apparatus to perform the method, of accurately detecting a corner in a remote area without requiring high cost.

Additional aspects and/or advantages of the invention will be set forth in part in the description which follows and, in part, will be apparent from the description, or may be learned by practice of the invention.

According to one aspect of the present invention, there is provided a method of detecting a corner. The method comprises acquiring a visible light image and an infrared image of a spatial area of interest and extracting corner information of the spatial area of interest using the acquired visible light image and the acquired infrared image.

The extracting of the corner information may comprise detecting a vertical edge from the visible light image, detecting a horizontal edge from the infrared image, and obtaining the corner information from an intersection point obtained by overlapping the detected vertical edge and the horizontal edge.

The acquiring of the visible light image and the infrared image may comprise alternately acquiring the visible light image and the infrared image by opening and closing an infrared bandpass filter.

The acquiring of the visible light image and the infrared image may comprise acquiring the visible light image by opening the infrared bandpass filter and capturing an image of the spatial area of interest; and acquiring the infrared image by closing the infrared bandpass filter and capturing an image of a light beam projected onto the spatial area of interest.

According to another aspect of the present invention, there is provided an apparatus to detect a corner. The apparatus comprises an image acquiring unit and a data processing unit. The image acquiring unit acquires a visible light image and an infrared image of a spatial area of interest, and the data processing unit extracts corner information of the spatial area of interest using the acquired visible light image and the acquired infrared image.

The data processing unit may comprise a vertical edge detecting unit, a horizontal edge detecting unit, an overlapping unit, and a mapping unit. The vertical edge detecting unit detects a vertical edge from the visible light image. The horizontal edge detecting unit detects a horizontal edge from the infrared image. The overlapping unit overlaps the detected vertical edge and the detected horizontal edge and detects an intersection point between the detected vertical edge and the detected horizontal edge. The mapping unit obtains the corner information from the detected intersection point.

The image acquiring unit may comprise a laser source, an image sensor, an infrared bandpass filter, and a control unit. The laser source projects a laser light onto the spatial area of interest. The image sensor captures an image of the spatial area of interest. The infrared bandpass filter is positioned to be opened and closed in front of the image sensor. The control unit controls the laser source, the image sensor, and the infrared bandpass filter to alternately acquire the visible light image and the infrared image of the spatial area of interest.

The control unit may control the image sensor and the infrared bandpass filter to capture an image of the spatial area of interest while the infrared bandpass filter is open in front of the image sensor so as to acquire the visible light image of the spatial area of interest, and may control the image sensor, the infrared bandpass filter, and the laser source to capture an image of the laser light projected onto the spatial area of interest while the infrared bandpass filter is closed in front of the image sensor so as to acquire the infrared image of the spatial area of interest.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
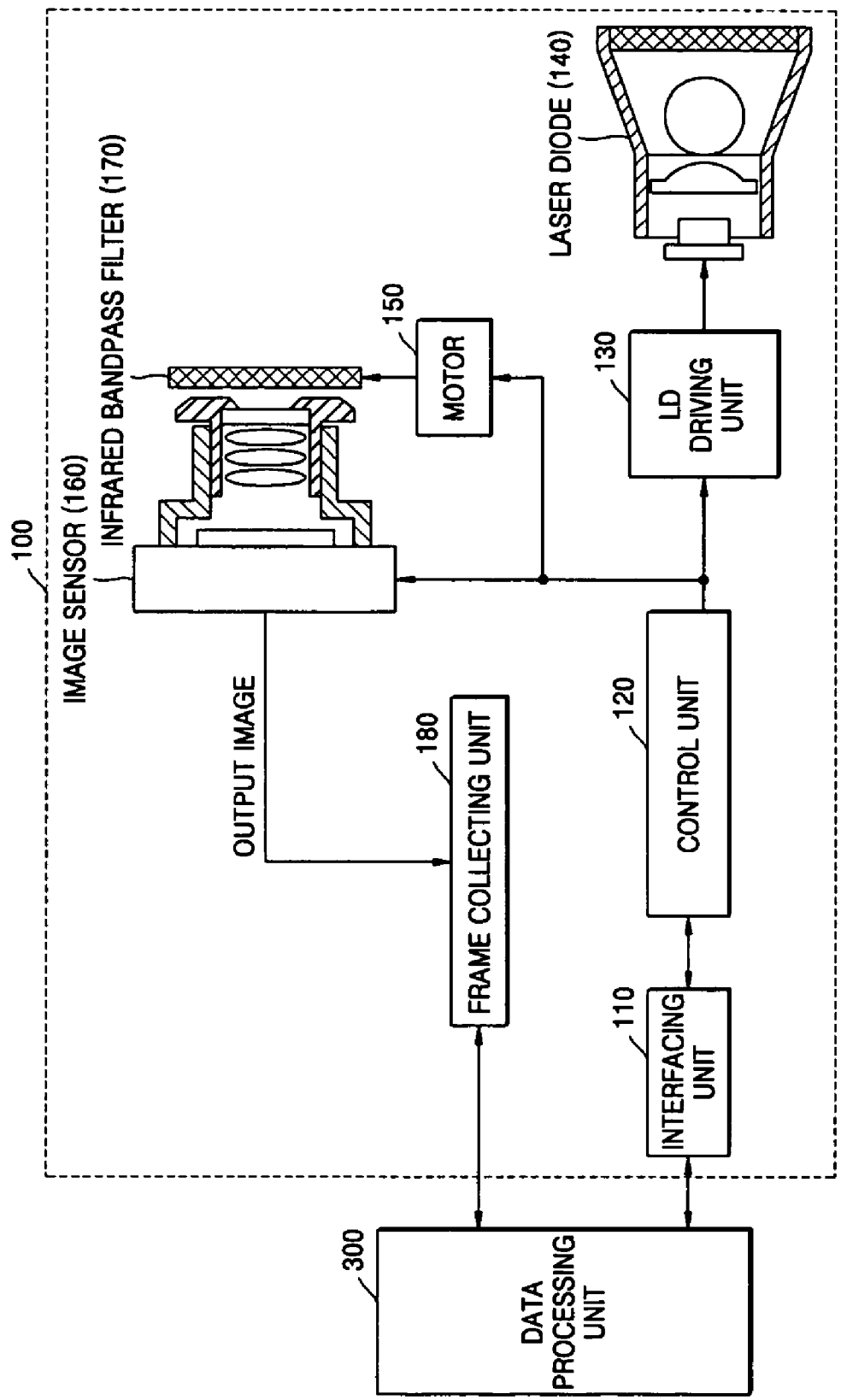
FIG. 1 is a schematic block diagram illustrating an apparatus to detect a corner point according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a schematic block diagram illustrating an apparatus to detect a corner point according to an embodiment of the present invention.

Referring to FIG. 1, the apparatus to detect a corner point includes an image acquiring unit 100 and a data processing unit 300. The image acquiring unit 100 acquires a visible light image and an infrared image of a predetermined spatial area. The data processing unit 300 extracts corner information from the visible light image and the infrared image that are acquired by the image acquiring unit 100.

The image acquiring unit 100 includes an interfacing unit 110, a control unit 120, a laser diode (LD) driving unit 130, a laser diode 140, a motor 150, an image sensor 160, an infrared bandpass filter 170, and a frame collecting unit 180.

The interfacing unit 110 is used for data transmission and reception between the data processing unit 300 and the image acquiring unit 100, and may be, for example, an RS 232 or a universal serial bus (USB).

The control unit 120 receives an image acquiring command from the data processing unit 300 through the interfacing unit 110, analyzes the received image acquiring command, and controls the image sensor 160, the motor 150, and the LD driving unit 130 according to a result of the analysis.

In other words, when the control unit 120 desires to capture a visible light image according to the image acquiring command, the control unit 120 controls the motor 150 to open the infrared bandpass filter 170 without controlling the LD driving unit 130 to operate, and controls the image sensor 160 to capture an area of interest while the infrared bandpass filter 170 is open.

Also, when the control unit 120 desires to acquire an infrared image according to the image acquiring command, the control unit 120 simultaneously controls the LD driving unit 130 to operate and the motor 150 to close the infrared bandpass filter 170, and controls the image sensor 160 to capture an area of interest onto which a light pattern is projected while the infrared bandpass filter 170 is closed. Since one aspect of the present invention is achieved by alternately acquiring an infrared image and a visible light image of an area of interest, there is no limitation to a method of implementing the image acquiring command. In other words, the control unit 120 may control the image sensor 160 to alternately capture an infrared image and a visible light image according to one image acquiring command, or the data processing unit 300 may issue an image acquiring command for an infrared image and an image acquiring command for a visible light image.

The LD driving unit 130 drives the laser diode 140, and the laser diode 140 projects a light pattern that operates in an infrared range having a wavelength of approximately 780 nm onto an area of interest in the form of a horizontal line. The light pattern may vary in shape, and preferably, though not necessarily, takes the form of a horizontal pattern that can be shown as stripes in the area of interest. The area of interest according to this embodiment of the present invention is a corner at which faces of two surfaces meet each other.

The motor 150 opens and closes the infrared bandpass filter 170 under the control of the control unit 120. In other words, the motor 150 moves the infrared bandpass filter 170 so that the infrared bandpass filter 170 is closed to acquire the infrared image, and moves the infrared bandpass filter 170 such that the infrared bandpass filter 170 is open to acquire the visible light image.

The image sensor 160 captures an image of the area of interest while the infrared bandpass filter 170 is open or closed under the control of the control unit 120, and provides the captured image to the frame collecting unit 180. The image sensor 160 may vary in type, as long as it is suitable for the acquisition of the image of the area of interest. For example, the image sensor 160 may be a charge coupled device (CCD) image sensor or a camera. It is preferable, though not necessary, that the image sensor 160 is positioned at the same vertical axis as the laser diode 140, so that a light pattern projected from the laser diode 140 can come into view of the image sensor 160.

The infrared bandpass filter 170 can pass wavelengths in the infrared range, and is moved by the motor 150 to be open or closed in front of the image sensor 160.

The frame collecting unit 180 transmits the infrared image or visible light image provided from the image sensor 160 to the data processing unit 300.

A structured light distance measuring system measures a distance to an obstacle by analyzing a reflection pattern of a line laser projected onto the obstacle using one camera and a line laser. Here, to prevent the reflection pattern of the line laser from being affected by an external light such as sunlight, an optical filter is installed in front of a lens of the camera. As a result, visible light is filtered and a visible light image cannot be received. In this embodiment of the present invention, the optical filter is removed from or returned to at its original position using a motor, and a reflection pattern of a laser and a visible light image are alternately collected and simultaneously analyzed, thereby more stably detecting a corner point.

Figure 2A:
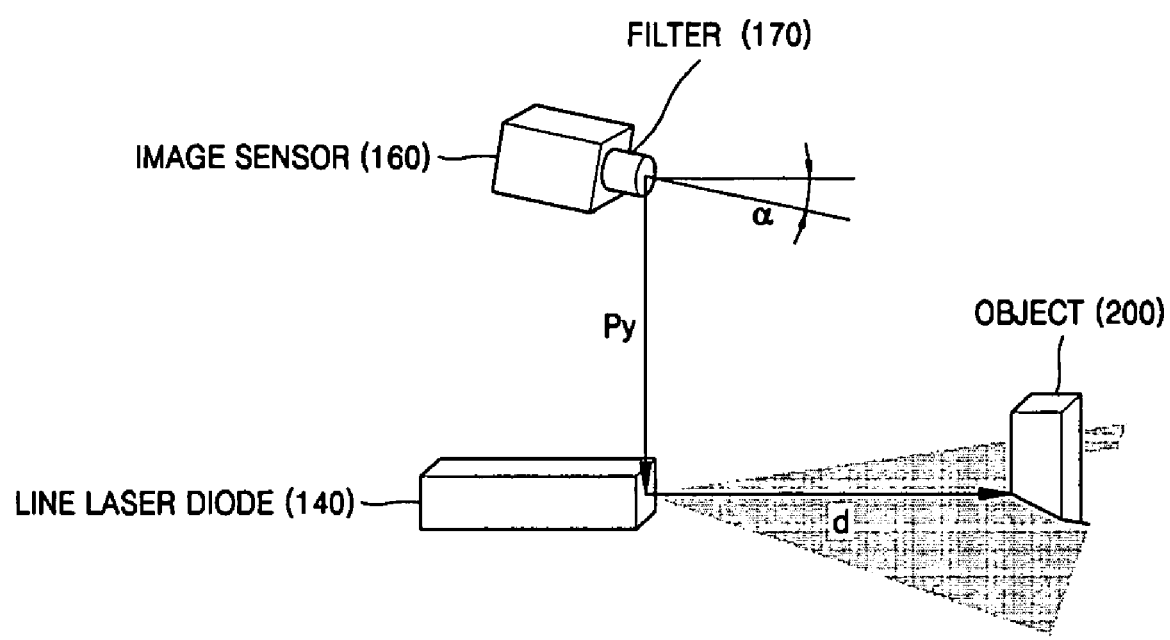
FIG. 2A is a view illustrating a structured light distance measuring system used in FIG. 1.

FIG. 2A is a view illustrating the structured light distance measuring system used in FIG. 1.

Referring to FIG. 2A, the infrared bandpass filter filter 170 is positioned in front of the image sensor 160. Once a light pattern is projected onto an object 200 by the line laser diode 140, the image sensor 160 captures the light pattern projected onto the object 200 while the filter 170 is located at its original position. Thus, the structured light distance measuring system can calculate a distance to the object 200 using an angle $\alpha$, at which the image sensor 160 is inclined, and a distance Py between the image sensor 160 and the line laser diode 140. The distance to the object 200 is expressed as spatial coordinates.

Figure 2B:
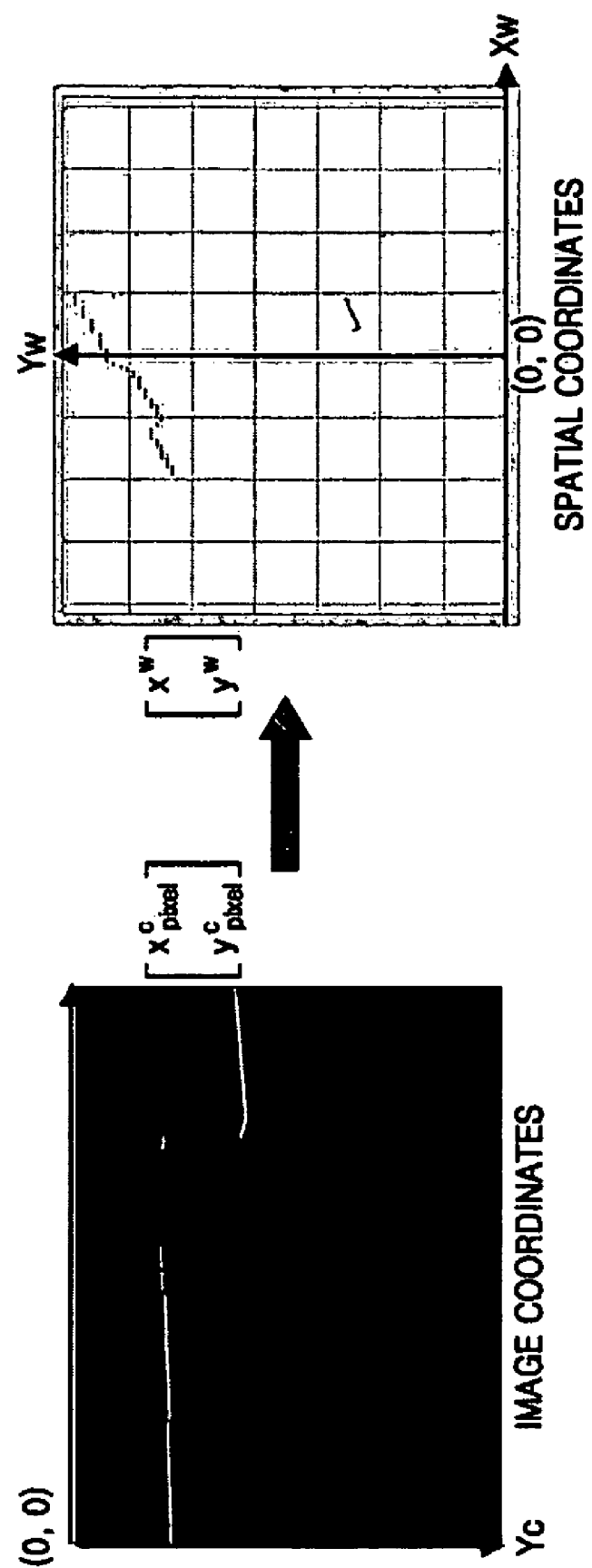
FIG. 2B is a view illustrating a transformation from image coordinates, obtained by the structured light distance measuring system of FIG. 2A, to spatial coordinates.

FIG. 2B is a view illustrating a transformation from image coordinates, obtained by the structured light distance measuring system of FIG. 2A, to spatial coordinates.

Referring to FIG. 2B, when coordinates of an image captured by the structured light distance measuring system are $$\begin{bmatrix} x_{pixel}^c \\ y_{pixel}^c \end{bmatrix},$$

and spatial coordinates are $$\begin{bmatrix} x^w \\ y^w \end{bmatrix},$$

the spatial coordinates can be obtained from the image coordinates using the following relationship.

$$\begin{bmatrix} x^w \\ y^w \end{bmatrix} = F(x_{pixel}^c, y_{pixel}^c) = \begin{bmatrix} \dfrac{Py \cdot (x_{pixel}^c - x_o^c) \cdot \dfrac{s_x}{f}}{\sin\alpha + \cos\alpha \cdot (y_{pixel}^c - y_o^c) \cdot \dfrac{s_y}{f}} \\ Py \cdot \dfrac{\cos\alpha - \sin\alpha \cdot (y_{pixel}^c - y_o^c) \cdot \dfrac{s_y}{f}}{\sin\alpha + \cos\alpha \cdot (y_{pixel}^c - y_o^c) \cdot \dfrac{s_y}{f}} \end{bmatrix}, \quad (1)$$

where $\alpha$ represents an angle at which a camera is inclined with respect to the horizontal, Py represents a distance between the center of the image sensor and the center of a laser diode, $x_o^c$ represents an x-coordinate of the center of an image, $y_o^c$ represents an y-coordinate of the center of the image, $s_x/f$ represents a scale between one pixel on the x-axis of the image and a spatial distance, and $s_y/f$ represents a scale between one pixel on the y-axis of the image and a spatial distance.

Figure 3:
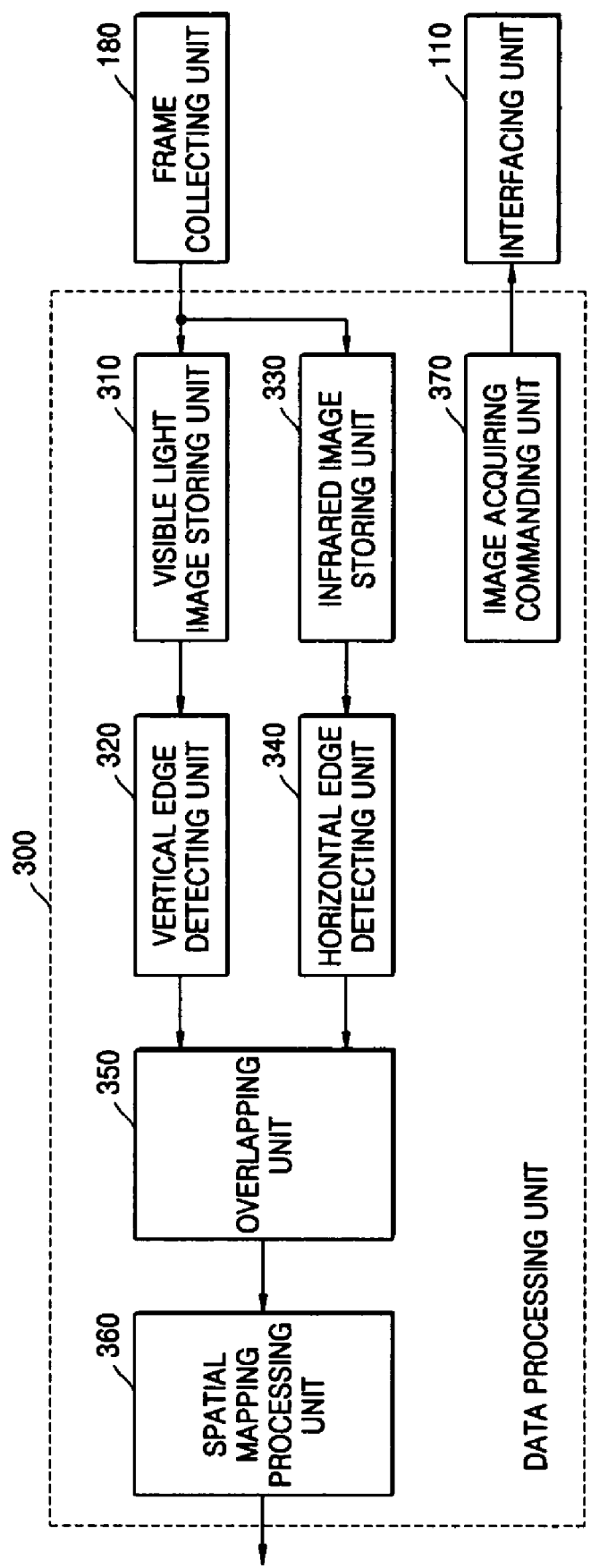
FIG. 3 illustrates a data processing unit shown in FIG. 1.

FIG. 3 illustrates the data processing unit 300 shown in FIG. 1.

Referring to FIG. 3, the data processing unit 300 includes a visible light image storing unit 310, a vertical edge detecting unit 320, an infrared image storing unit 330, a horizontal edge detecting unit 340, an overlapping unit 350, a spatial mapping processing unit 360, and an image acquiring commanding unit 370.

The visible light image storing unit 310 stores a visible light image of a spatial area of interest, which is received from the frame collecting unit 180.

The vertical edge detecting unit 320 is provided with the visible light image from the visible light image storing unit 310, detects a vertical edge from the visible light image, and provides the detected vertical edge to the overlapping unit 350.

The infrared image storing unit 330 stores an infrared image of the spatial area of interest, which is received from the frame collecting unit 180.

The horizontal edge detecting unit 340 is provided with the infrared light image from the infrared image storing unit 330, detects a horizontal edge from the infrared light image, and provides the detected horizontal edge to the overlapping unit 350.

The overlapping unit 350 overlaps the vertical edge, received from the vertical edge detecting unit 320, and the horizontal edge, received from the horizontal edge detecting unit 340, detects intersection points between the vertical edge and the horizontal edge, and provides the detected intersection points to the spatial mapping processing unit 360. The intersection points between the vertical edge and the horizontal edge are expressed as two-dimensional coordinates.

The spatial mapping processing unit 360 receives the information regarding the intersection points between the vertical edge and the horizontal edge from the overlapping unit 350, and maps and outputs the received information to three-dimensional spatial coordinates.

The image acquiring commanding unit 370 commands the image acquiring unit 100 to capture an image by alternately acquiring a visible light image and an infrared image of a spatial area of interest.

Figure 9:
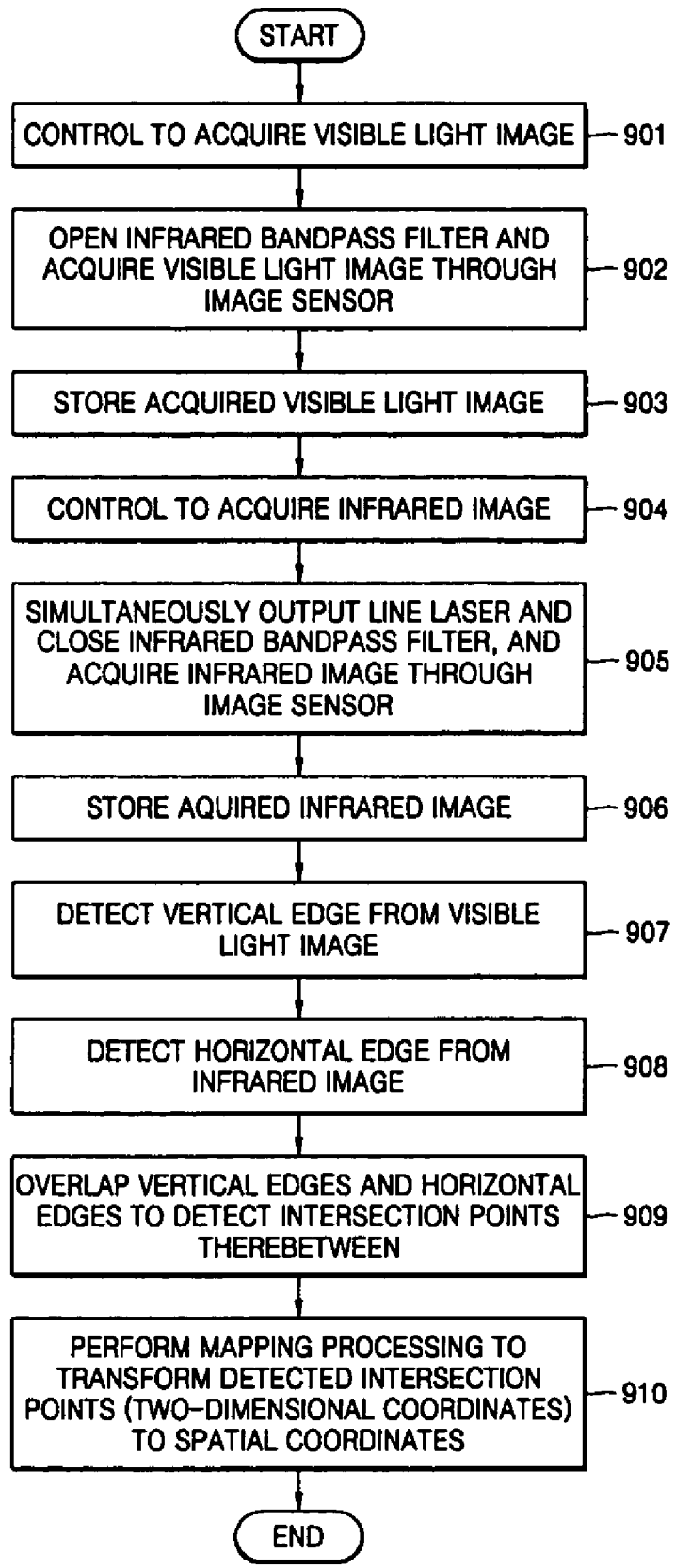
FIG. 9 is a flowchart illustrating a method of detecting a corner point according to an embodiment of the present invention.

FIG. 9 is a flowchart illustrating a method of detecting a corner point according to an embodiment of the present invention.

Referring to FIG. 9, the control unit 120 of the image acquiring unit 100 controls the image sensor 160 and the motor 150 to acquire the visible light image of the area of interest, in operation 901.

The motor 150 then moves the infrared bandpass filter 170 to open the same, and the image sensor 160 captures the visible light image of the area of interest while the infrared bandpass filter 170 is open, in operation 902.

The frame collecting unit 180 receives the acquired visible light image and provides the same to the data processing unit 300, and the visible light image storing unit 310 of the data processing unit 300 stores the received visible light image, in operation 903.

Figure 4:
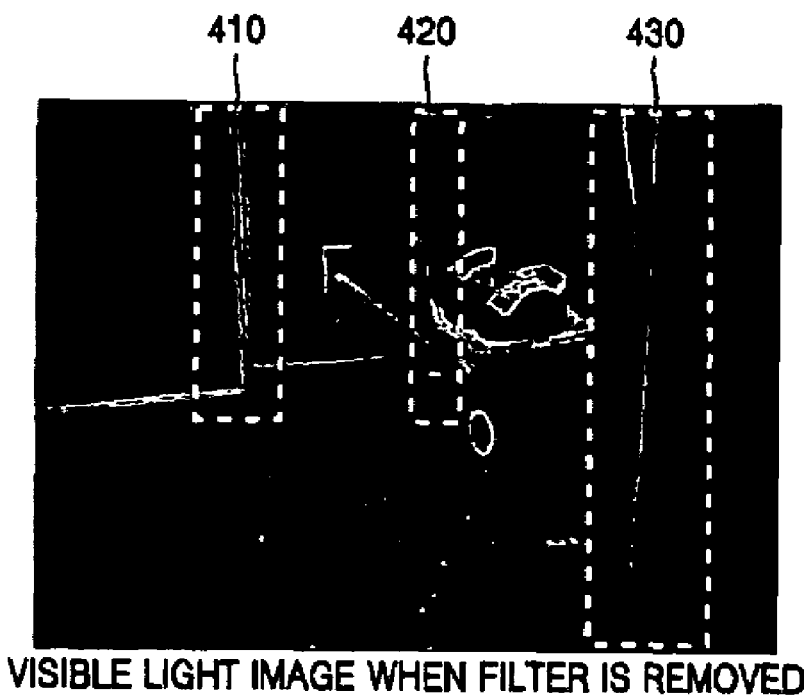
FIG. 4 illustrates a visible light image captured by the apparatus to detect a corner point shown in FIG. 1.

FIG. 4 illustrates an example of an image captured by photographing an area of interest having corners in a visible light range.

Referring to FIG. 4, the area of interest that is photographed in the visible light range has a total of three corners 410, 420, and 430.

In operation 904, the control unit 120 of the image acquiring unit 100 controls the image sensor 160, the motor 150, and the LD driving unit 130 to acquire an infrared image of the area of interest.

The LD driving unit 130 then drives the laser diode 140 to output a line laser, the motor 150 closes the infrared bandpass filter 170, and the image sensor 160 captures the infrared image of the area of interest while the infrared bandpass filter 170 is closed, in operation 905.

The frame collecting unit 180 receives the acquired infrared image and provides the same to the data processing unit 300, and the infrared image storing unit 330 of the data processing unit 300 stores the received infrared image, in operation 906.

Figure 5:
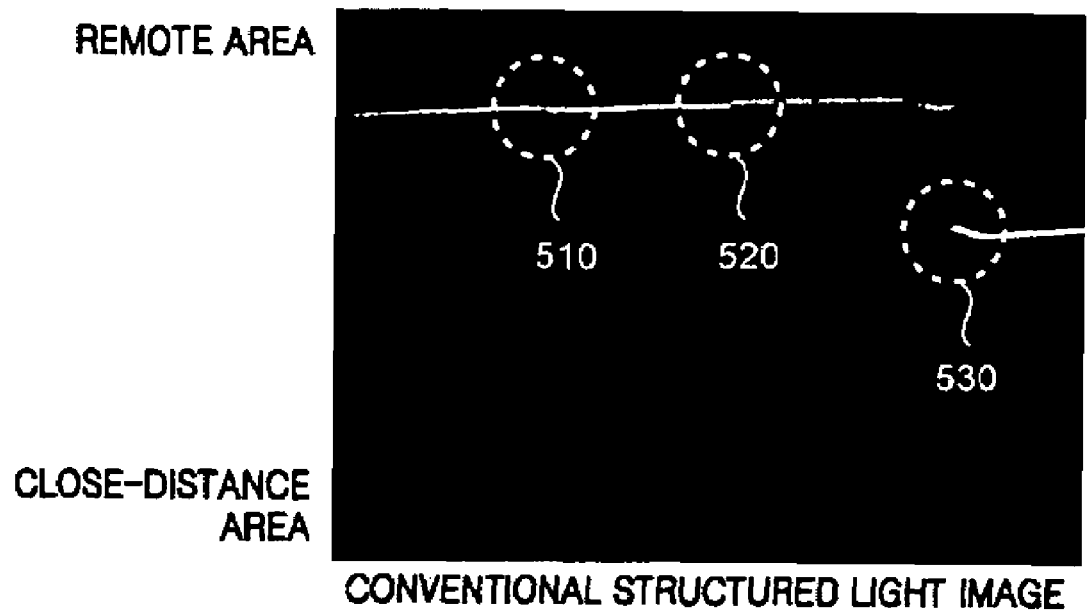
FIG. 5 illustrates an infrared image captured by the apparatus to detect a corner point shown in FIG. 1.

FIG. 5 shows an example of an image captured by photographing the area of interest in an infrared range.

Referring to FIG. 5, a horizontal light pattern is projected onto the area of interest and a captured image of the area of interest is shown. Due to corners that exist in the area of interest, the projected horizontal light pattern does not show a complete straight line, but shows several deviations. In FIG. 5, portions 510, 520, and 530 marked with circles indicate portions where the corners exist, corresponding to the three corners 410, 420, and 430 of FIG. 4.

In operation 907, the vertical edge detecting unit 320 detects a vertical edge from the visible light image.

Figure 6:
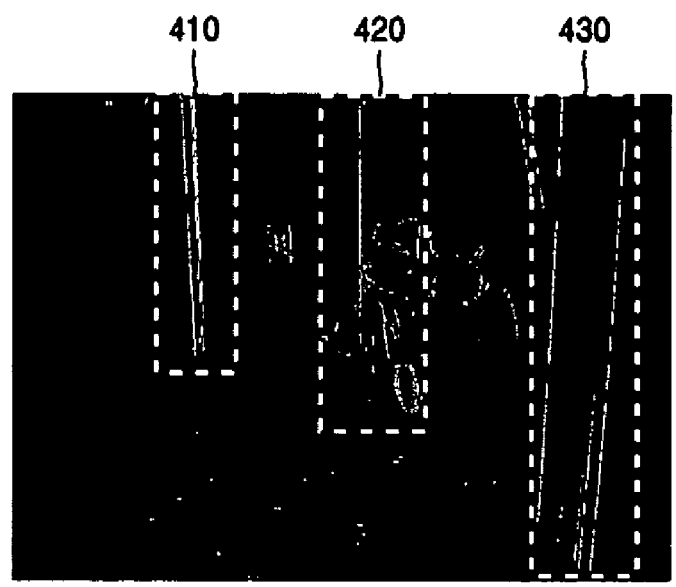
FIG. 6 illustrates a vertical edge map showing vertical edges detected from the visible light image of FIG. 4.

FIG. 6 illustrates a vertical edge map showing vertical edges detected from the visible light image of FIG. 4. Vertical edges 410, 420, and 430 indicate corners in space.

In operation 908, the horizontal edge detecting unit 340 detects a horizontal edge from the infrared image.

Figure 7:
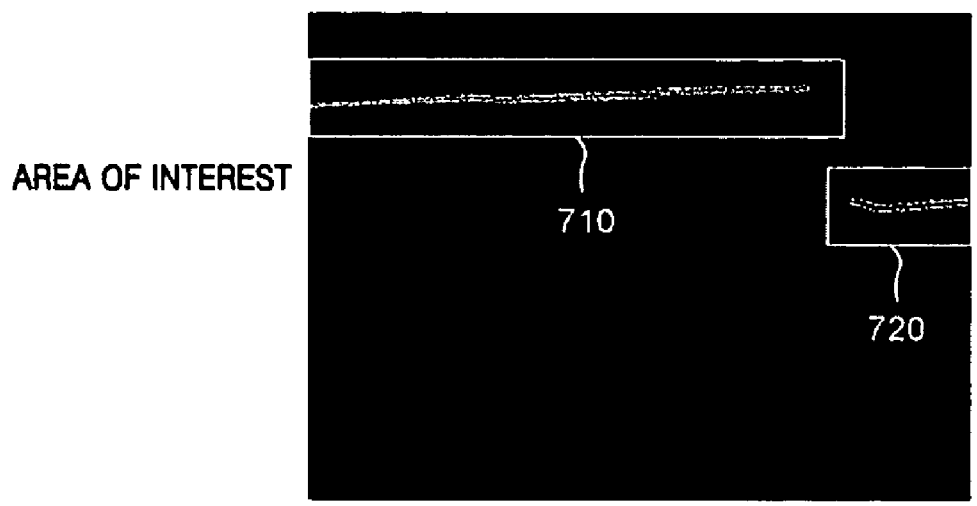
FIG. 7 illustrates a horizontal edge map showing horizontal edges detected from the infrared image of FIG. 5.

FIG. 7 illustrates a horizontal edge map showing horizontal edges detected from the infrared image of FIG. 5. Referring to FIG. 7, two horizontal edges 710 and 720 are shown.

In operation 909, the overlapping unit 350 overlaps the vertical edges and the horizontal edges to detect intersection points therebetween.

Figure 8A:
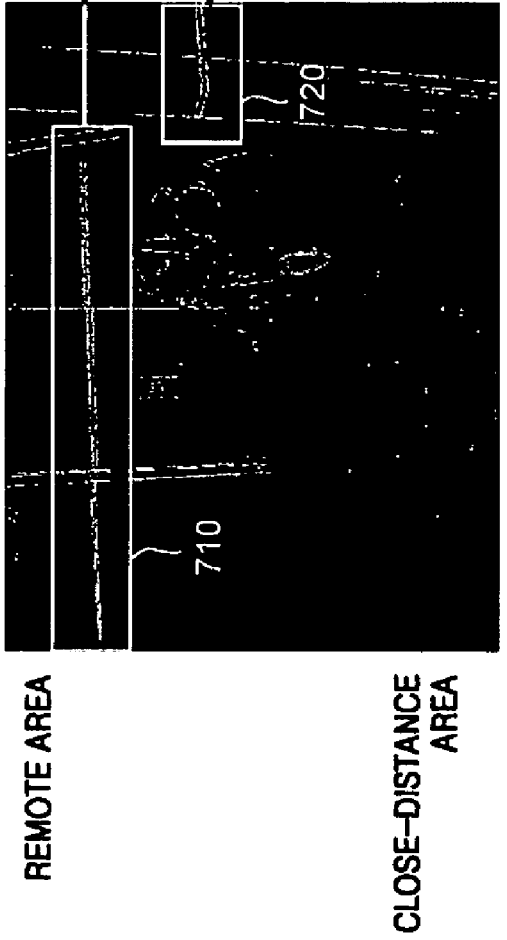
FIG. 8A illustrates an overlap edge map obtained by overlapping the vertical edge map of FIG. 6 and the horizontal edge map of FIG. 7.
Figure 8B:
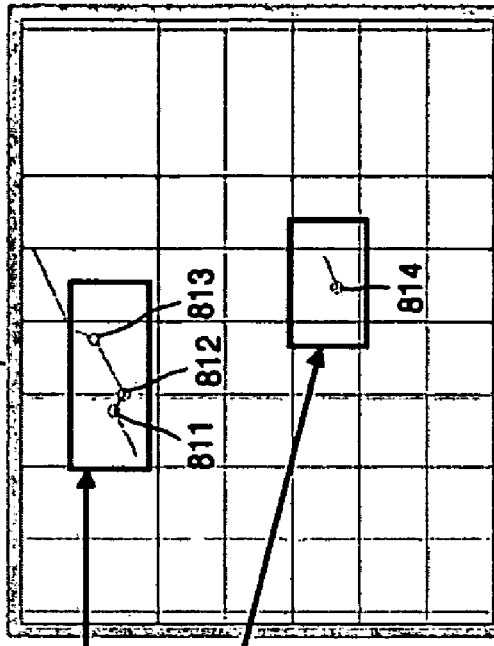
FIG. 8B illustrates intersection points in the overlap edge map.

FIG. 8A illustrates an overlap edge map obtained by overlapping the horizontal edges and the vertical edges, and FIG. 8B illustrates the intersection points between the vertical edges and the horizontal edges in the overlap edge map.

The intersection points exist in areas 710 and 720 in the overlap edge map in FIG. 8A, and are expressed as 4 coordinates 811, 812, 813, and 814 in FIG. 8B.

In operation 910, the spatial mapping processing unit 360 performs mapping processing to transform the detected intersection points, i.e., two-dimensional coordinates, to spatial coordinates. Such mapping processing to spatial coordinates can be performed using an equation as described with reference to FIG. 2B.

As described above, according to the present invention, it is possible to stably detect a corner in a spatial area of interest in a remote area using a camera and a simple filter without involving high cost.

The method of detecting a corner according to the present invention can be used to enable mobile robots to safely move themselves to their destinations. Also, the method can be used in the field of location and azimuth calculation, path planning and tracking control, automatic obstacle avoidance, and moving object tracking.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a three-dimensional corner in a space, the method comprising:
    acquiring a visible light image and an infrared image of a three-dimensional spatial area of interest; and
    extracting, by way of a processor, corner information of the three-dimensional spatial area of interest by detecting an edge having a first orientation from the acquired visible light image and by detecting an edge having a second orientation from the acquired infrared image, wherein the second orientation is orthogonal to the first orientation.

2. The method of claim 1, wherein the extracting of the corner information further comprises:
    obtaining the corner information from an intersection point obtained by overlapping the detected edge having the first orientation and the detected edge having the second orientation.

3. The method of claim 1, wherein the acquiring of the visible light image and the infrared image comprises alternately acquiring the visible light image and the infrared image by opening and closing an infrared bandpass filter.

4. The method of claim 3, wherein the acquiring of the visible light image and the infrared image comprises:
    acquiring the visible light image by opening the infrared bandpass filter and capturing an image of the spatial area of interest; and
    acquiring the infrared image by closing the infrared bandpass filter and capturing an image of a light beam projected onto the spatial area of interest.

5. An apparatus to detect a three-dimensional corner in a space, the apparatus including a processor and comprising:
    an image acquiring unit to acquire a visible light image and an infrared image of a three-dimensional spatial area of interest; and
    a data processing unit to extract corner information of the three-dimensional spatial area of interest by detecting an edge having a first orientation from the acquired visible light image and by detecting an edge having a second orientation from the acquired infrared image, wherein the second orientation is orthogonal to the first orientation.

6. The apparatus of claim 5, wherein the data processing unit further comprises:
    an overlapping unit to overlap the detected edge having the first orientation and the detected edge having the second orientation, and to detect an intersection point between the detected edge having the first orientation and the detected edge having the second orientation; and
    a mapping unit to obtain the corner information from the detected intersection point.

7. The apparatus of claim 5, wherein the image acquiring unit comprises:
    a laser source to project a laser light onto the spatial area of interest;
    an image sensor to capture an image of the spatial area of interest;
    an infrared bandpass filter positioned to be opened and closed in front of the image sensor; and
    a control unit to control the laser source, the image sensor, and the infrared bandpass filter to alternately acquire the visible light image and the infrared image of the spatial area of interest.

8. The apparatus of claim 7, wherein the control unit controls the image sensor and the infrared bandpass filter to capture an image of the spatial area of interest while the infrared bandpass filter is open in front of the image sensor so as to acquire the visible light image of the spatial area of interest, and controls the image sensor, the infrared bandpass filter, and the laser source to capture an image of the laser light projected onto the spatial area of interest while the infrared bandpass filter is closed in front of the image sensor so as to acquire the infrared image of the spatial area of interest.

9. The apparatus of claim 7, further comprising a motor to open and close the infrared bandpass filter in front of the image sensor.

10. The apparatus of claim 7, wherein the image sensor is a charge coupled device (CCD) image sensor or a camera.

11. The apparatus of claim 7, wherein the image sensor is positioned at a same vertical axis as the laser source.

12. The apparatus of claim 5, further comprising an interfacing unit to exchange data between the image acquiring unit and the data processing unit.

13. The apparatus of claim 12, wherein the interfacing unit comprises an RS 232 or a universal serial bus (USB).

14. At least one computer readable medium, excluding carrier waves, storing instructions that control at least one processor to perform a method of detecting a three-dimensional corner in a space, the method comprising:
    acquiring a visible light image and an infrared image of a three-dimensional spatial area of interest; and
    extracting, by way of a processor, corner information of the three-dimensional spatial area of interest by detecting an edge having a first orientation from the acquired visible light image and by detecting an edge having a second orientation from the acquired infrared image, wherein the second orientation is orthogonal to the first orientation.

15. The method performed by the computer readable medium of claim 14, wherein the extracting of the corner information further comprises:
    obtaining the corner information from an intersection point obtained by overlapping the detected edge having the first orientation and the detected edge having the second orientation.

16. A method of detecting a three-dimensional corner in a space, the method comprising:
    overlapping a visible light image and an infrared image of a three-dimensional spatial area; and
    extracting, by way of a processor, three-dimensional corner information from the overlapped images by detecting an edge having a first orientation from the overlapped visible light image and by detecting an edge having a second orientation from the overlapped infrared image, wherein the second orientation is orthogonal to the first orientation.

17. The method of claim 16, further comprising alternately acquiring the visible light image and the infrared image from the spatial area.

18. The method of claim 16, wherein the acquiring the visible light image comprises photographing the spatial area.

19. The method of claim 16, wherein the acquiring the infrared image comprises capturing an image of a light beam projected onto the spatial area.

20. The method of claim 19, wherein the projected light beam is a laser.

21. The method of claim 19, wherein the light beam is projected in a horizontal pattern.

22. A method of detecting a three-dimensional corner in a space, the method comprising:
    alternately acquiring a visible light image and infrared image of a three-dimensional spatial area to extract three-dimensional corner information,
    wherein the images are alternately acquired by removing and replacing an optical filter over an image capturing device; and
    extracting, by way of a processor, corner information of the three-dimensional spatial area of interest by detecting an edge having a first orientation from the acquired visible light image and by detecting an edge having a second orientation from the acquired infrared image, wherein the second orientation is orthogonal to the first orientation.

23. The method of claim 22, wherein the optical filter is an infrared bandpass filter.

* * * * *

UNITED STATES PATENT AND TRADEMARK OFFICE
CERTIFICATE OF CORRECTION

PATENT NO. : 7,646,917 B2 Page 1 of 1
APPLICATION NO. : 11/282605
DATED : January 12, 2010
INVENTOR(S) : Myungjin Jung et al.

It is certified that error appears in the above-identified patent and that said Letters Patent is hereby corrected as shown below:

On the Title Page, Item (75) (Inventors), Line 2, change "Hyoungkl Lee," to --Hyoungki Lee,--.

Signed and Sealed this

Thirteenth Day of April, 2010

David J. Kappos
*Director of the United States Patent and Trademark Office*